United States Patent
DiChiara, Jr.

(10) Patent No.: US 6,613,255 B2
(45) Date of Patent: Sep. 2, 2003

(54) METHOD OF MAKING A PERMEABLE CERAMIC TILE INSULATION

(75) Inventor: Robert A. DiChiara, Jr., Carlsbad, CA (US)

(73) Assignee: The Boeing Company, Chicago, IL (US)

(*) Notice: Subject to any disclaimer, the term of this patent is extended or adjusted under 35 U.S.C. 154(b) by 26 days.

(21) Appl. No.: 09/834,360

(22) Filed: Apr. 13, 2001

(65) Prior Publication Data
US 2002/0149128 A1 Oct. 17, 2002

(51) Int. Cl.$^7$ .............................................. B29C 65/00
(52) U.S. Cl. .......................... 264/44; 264/640; 264/641
(58) Field of Search ........................... 264/43, 44, 640, 264/641

(56) References Cited

U.S. PATENT DOCUMENTS

| | | | |
|---|---|---|---|
| 3,138,009 A | 6/1964 | McCreight | |
| 3,243,313 A | 3/1966 | Aves, Jr. | |
| 3,937,007 A | 2/1976 | Kappler | 60/39.06 |
| 3,952,083 A | 4/1976 | Fletcher et al. | 264/63 |
| 4,084,161 A | 4/1978 | Manning et al. | 343/18 A |
| 4,148,962 A | 4/1979 | Frosch et al. | 428/366 |
| 4,255,197 A | 3/1981 | Peralta et al. | 106/41 |
| 4,307,051 A | 12/1981 | Sageant et al. | 264/53 |
| 4,338,368 A | 7/1982 | Lovelace et al. | 428/212 |
| 4,358,480 A | 11/1982 | Ecord et al. | 427/140 |
| 4,452,749 A | 6/1984 | Kolvek et al. | 264/30 |
| 4,542,888 A | 9/1985 | Robyn et al. | 266/44 |
| H48 H | 4/1986 | Heichel | 264/44 |
| 4,746,287 A * | 5/1988 | Lannutti | 431/328 |
| 5,079,082 A | 1/1992 | Leiser et al. | 428/307.7 |
| 5,092,765 A | 3/1992 | Wahfeld | 432/3 |
| 5,236,151 A | 8/1993 | Hagle et al. | 244/117 A |
| 5,441,681 A * | 8/1995 | Thomas | |
| 5,514,238 A * | 5/1996 | Mauduit et al. | 156/201 |
| 5,536,562 A | 7/1996 | Tran et al. | 428/218 |
| 5,624,613 A * | 4/1997 | Rorabaugh et al. | 264/44 |
| 5,668,070 A | 9/1997 | Hong et al. | 501/126 |
| 5,702,761 A * | 12/1997 | DiChiara, Jr. et al. | 427/181 |
| 5,928,775 A | 7/1999 | DiChiara, Jr. et al. | 428/312.2 |
| 6,309,743 B1 * | 10/2001 | Fujita | 428/317.9 |

FOREIGN PATENT DOCUMENTS

| | | |
|---|---|---|
| DE | 552 676 A1 | 1/1993 |
| JP | 4-189695 | 7/1992 |

OTHER PUBLICATIONS

Daniel B. Leiser, Marnell Smith, and David A. Stewart, "Options for Improving Rigidized Ceramic Heatshields", Ceramic Engineering and Science Proceedings, 6, No. 7–8, pp. 757–768 (1995).

* cited by examiner

Primary Examiner—Christopher A. Fiorilla
(74) Attorney, Agent, or Firm—Harness Dickey & Pierce P.L.C.

(57) ABSTRACT

A method of making a permeable fiber-reinforced ceramic body comprising mixing an organic particulate with silica fiber, alumina fiber, alumina borosilicate fiber, a dispersant, and water to produce a slurry of fibrous ceramic material. The slurry is then placed within a mold and vaccuum pressure is applied thereto to substantially remove the water to form a fibrous ceramic body. The fibrous ceramic body is then dried and sintered to a temperature sufficient to bond the ceramic material together to form a porous ceramic article. Simultaneously, the fibrous ceramic body is heated to a temperature sufficient to generally burn off the organic particulate to create voids interconnecting the pores to form a permeable fiber reinforced porous ceramic article.

9 Claims, 1 Drawing Sheet

METHOD OF MAKING A PERMEABLE CERAMIC TILE INSULATION

FIELD OF THE INVENTION

This invention relates to ceramic insulation tiles and, more particularly, to a method a making a fiber-reinforced ceramic insulation tile that provides increased permeability therethrough.

BACKGROUND OF THE INVENTION

As is well known in the art, ceramic bodies in the form of tiles have been widely used in a number of aeronautical and aerospace applications to insulate structures against high temperatures. For example, such ceramic tiles have been used to protect the Space Shuttle fuselage against the high temperatures associated with reentry into the Earth's atmosphere. Ceramic tiles are preferred in such applications, as they possess the ability to withstand these high temperatures, have excellent thermal insulation, and can withstand thermal shock. These materials are well known in the art and include, for example, AETB (alumina enhanced thermal barrier), HTP (high thermal performance), FRCI (fibrous refractory composite insulation) and LI (LOCKHEED insulation) materials.

One known type of ceramic tile is a porous ceramic made by pressing together fibers of one or more ceramic materials, such as alumina enhanced thermal barrier (AETB) material which is well known in the art and more fully described in Leiser et al., "Options for Improving Rigidized Ceramic Heatshields", Ceramic Engineering and Science Proceedings, 6, No. 7–8, pp. 757–768 (1985) and Leiser et al., "Effect of Fiber Size and Composition on Mechanical and Thermal Properties of Low Density Ceramic Composite Insulation Materials", NASA CP 2357, pp. 231–244 (1984). As those skilled in the art will understand, the tile may be formed from other fibrous low-density silica-based materials including, for example, LOCKHEED insulation (LI), high thermal performance (HTP), and fibrous refractory composite insulation (FRCI), which is well known in the art and more fully described in U.S. Pat. No. 4,148,962, the disclosure of which is incorporated herein by reference.

In fabricating tiles like AETB, fibers of an insulating material, such as silica, alumina borosilicate, and alumina, are mixed with water to form a slurry. The slurry is deposited into a casting tower where the water is drained and the silica fibers are subjected to compressive forces to form a raw block of insulation material having a cross-sectional area that may range from 144 square inches to almost 576 square inches depending upon the dimensions of the casting tower. The raw block is then dried in an oven and subsequently fired (sintered) to bond the fibers of the insulating material together. Thereafter, tiles are formed from the fired block through conventional machining processes wherein tiles of a desired shape are cut from the solid block.

This ceramic tile is resistant to damage from thermal shock and thermal cycling. However, it is relatively soft and can be damaged by external impact and wear forces. To lessen such damage, it is known to apply protective coatings to the exterior surface of the ceramic insulation. Examples of these protective coatings are disclosed in U.S. Pat. Nos. 5,702,761 and 5,928,775, issued to DiChiara, Jr. et al. and U.S. Pat. No. 5,079,082, issued to Leiser, et al., the disclosures of which are incorporated herein by reference. However, known ceramic tiles suffer from certain disadvantages in that although they have a generally high porosity, which makes them light weight, their permeability is very low, which generally restricts the flow of fluid therethrough.

In many applications, it would be preferable to introduce a cooling fluid, such as bleed air, through the tile to aid in maintaining a proper temperature of the tile. As described above, conventional ceramic tiles are very porous, yet they are not very permeable. This inhibits the use of bleed air to cool the tile and, thus, limits the use of ceramic tiles to only certain applications. Accordingly, there exists a need in the relevant art to provide a ceramic tile that is sufficiently permeable to enable a cooling fluid to flow therethrough.

In the aeronautical industry, there has been a growing trend to produce space vehicles that fly longer in the atmosphere in an aircraft-like configuration. Additionally, there is a growing trend to insulate aircraft structures from the engines using insulation tile materials. These changes in mission applications change the way insulating materials are used. For instance, space vehicles, such as the space shuttle, use insulation tiles as a pure insulator. These tiles are sized in thickness to accommodate a high temperature heat pulse for a short period of time (seconds), such as that which occurs during a short reentry maneuver. This thickness ensures that the inner mold line or interior surface of the tile does not reach a temperature where the adhesive used to bond the interior surface of the tile to the space vehicle structure is adversely effected.

Typically, the maximum temperature along the inner mold line of the insulating tile occurs at some point (usually minutes) after the high temperature heat pulse has gone from the surface. As space vehicles operate longer in the atmosphere, like an aircraft, the thermal design needs of the insulator change. That is, vehicles that fly longer in the atmosphere will approach a steady state heating condition of the tile rather than a heat temperature heat pulse. Therefore, this steady exposure to intense heat must not expose the inner mold line to excessive heat; as such excessive heat may adversely reduce the useful life of the adhesive. These insulating tiles are highly porous (approximately 90% porosity) but have low permeability (approximately 25 microns in size), which limits the throughflow of fluid.

Accordingly, it is a principal object of the present invention to provide a method of making a fiber reinforced ceramic tile having a high permeability to increase the mass flow of a cooling fluid therethrough.

It is another object of the present invention to provide a method of making a fiber reinforced ceramic tile having a high permeability, yet a porosity and density that is generally equal to a standard ceramic tile.

It is still another object of the present invention to provide a method of making a fiber reinforced permeable ceramic tile that is not susceptible to the shortcomings of the prior art designs.

SUMMARY OF THE INVENTION

The above and other objects are provided by a method of making a permeable, fiber-reinforced ceramic tile in accordance with the teachings of the present invention. The method of making a permeable fiber-reinforced ceramic body according to the principles of the present invention includes mixing an organic particulate with silica fiber, alumina fiber, alumina borosilicate fiber, a dispersant, and water to produce a slurry of fibrous ceramic material. The slurry is then placed within a mold and vacuum pressure is applied thereto to substantially remove the water so as to form a fibrous ceramic body. The fibrous ceramic body is then dried and sintered to a temperature sufficient to bond the ceramic material together to form a porous ceramic article. Simultaneously, the fibrous ceramic body is heated to a temperature sufficient to generally burn off the organic particulate to create voids interconnecting the pores to form a permeable fiber reinforced porous ceramic article.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENT

Figure 1:
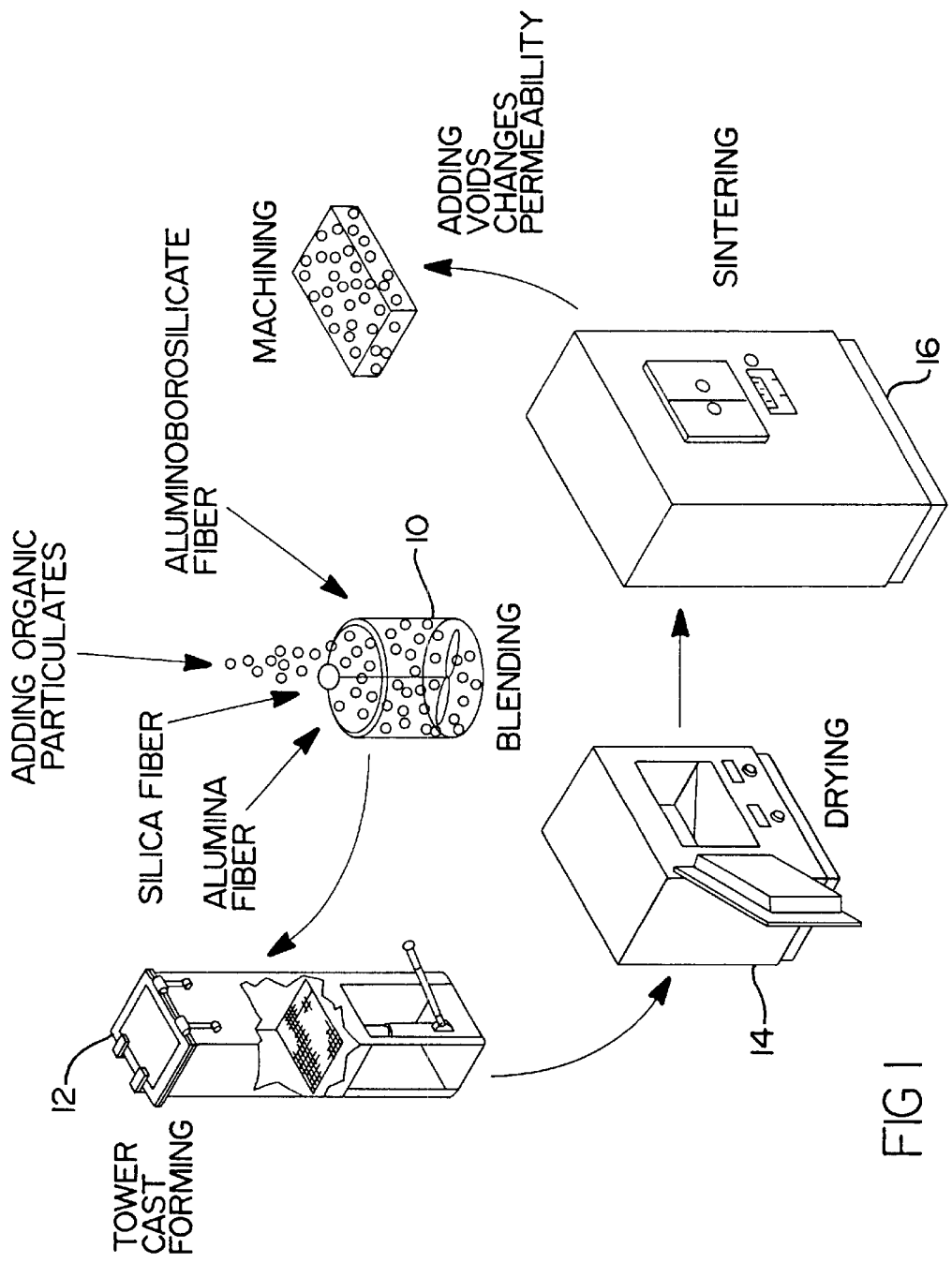
FIG. 1 is a schematic view of the method according to the principles of the present invention.

Referring to the drawing, the present invention provides a method of making a fiber reinforced ceramic tile having a high permeability relative to conventional ceramic tiles that can be cooled so as to be used in applications presenting temperatures above 1000 to 2400° F. and/or in applications requiring improved structural integrity. As one skilled in the art will recall, the permeability of an article is dependent on three main factors: 1) the amount of porosity, 2) the size of porosity, and 3) the toreros path. In order to increase the permeability of the fibrous ceramic tiles of the present invention, organic particulate (particles, spheres or fibers) are added during a mixing operation and later burned off to leave voids that increase the pore size and reduces the toreros path and thus increase the permeability. It is anticipated that bleed air or the like flowing therethrough could later cool the permeable ceramic tile of the present invention.

With particular reference to FIG. 1, the permeable ceramic tile of the present invention is produced by the following method. First, a mixture consisting of alumina fiber, silica fiber, and alumina borosilicate fiber is combined within a mixer or blender 10. For a discussion regarding the appropriate concentrations of the above fibers, attention should be directed to U.S. Pat. No. 4,148,962, issued to Frosch, et. al., which is incorporated herein by reference. This mixture described thus far is commonly referred to as Alumina Enhanced Thermal Barrier (AETB), which is available from NASA Ames Research. The specific composition is dependent upon the specific application and the specific required properties of the final tile.

During the mixing process after the above fibers are mixed within mixer 10, organic particulates, generally in the range of less than 30% by weight, is added to the AETB fibers and mixed for a predetermined amount of time before casting. These organic particulates may be any material that when burned generally creates a gas and a minimal amount of residue or ash. The effect of permeability change depends on both the amount and the size of the organic particulates added. It is anticipated that these organic particulates according to the principles of the present invention may include seeds, plastic, wood pulp, and the like. For example, in a first example, bird seed or poppy seed is used and according to another example wood pulp (of pine or maple) was used having mesh size between 60 and 200 mesh (preferably using a mixture of both 80 and 100 mesh of Pine). It should be appreciated that the particular organic particulates used in the present invention may be any one of a number of materials that create voids within a ceramic tile following firing of the ceramic tile.

The above mixture, including the organic particulates, is then mixed and blended together with water and a dispersant to create a slurry having a viscosity comparable with that of water. This slurry is then transferred to a tower cast mold 12 having a screen or mat through which the slurry is poured. The resulting effect is that the fibers and organic particulates are suspended and compacted against the screen. A vacuum is used to further draw or collapse the fibers and organic particulates in tower cast mold 12. A ram may also be used to apply pressure to the top of the mixture to further enhance the compacting effect of the fibers.

Following the casting process in which the fibers and organic particulates were generally compacted into a fibrous ceramic body, the fibrous ceramic body is then transferred to a drying oven 14. Within drying oven 14, the body is allowed to dry to remove the remaining water within the now compacted mixture. The body will remain within drying oven 14 for a predetermined amount of time or generally until the water is substantially removed from the body.

The dried, fiber and organic particulate ceramic body is then transferred to a sintering device 16 in which it is fired to a temperature sufficient to sinter the ceramic fibers and, furthermore, to burn off the organic particulates. That is, during this firing process, the organic particulates are burned off to create voids and/or channels interconnecting the pores within the fiber-reinforced, ceramic body. Typically, these organic particulates, such as seeds, wood pulp or plastic produce $CO_2$ gas. However, as a by-product of the burning of these organic particulates, voids are produced within the ceramic tile. Furthermore, as a product of the sintering process, pores are produced within the block. Many of these pores interconnect with the voids or channels produced by the burning of the organic particulates, thus producing paths through which fluids may pass and improving the permeability of the ceramic tile.

Finally, the now fired, permeable ceramic block may be machined to produce a permeable, fiber-reinforced, ceramic tile for use in aeronautical and aerospace applications.

According to the present invention, it is preferable that the mixture includes approximately less than or about 30% by weight of organic particulates, about 22% by weight of alumina fiber, about 15% by weight alumina borosilicate fiber, and about 65% by weight silica fiber.

It should be understood that these channels and voids formed as a result of the burning of the organic particulates not only provide improved permeability but also increases the porosity. This increased porosity reduces the density of the ceramic tile. In an effort to accommodate for the reduction in strength associated with the reduction in density, the specific fiber composition, packing pressure within the cast tower, fiber mixing times, firing times, and temperatures should be adjusted to produce a higher density.

It should also be readily apparent that the permeable ceramic tile of the present invention may be used in conjunction with a surface coating if additional surface impact resistance is required, although it is not necessary. However, from a reading of the above, it should be understood that any coating that produces a sealing layer over the top of the pores will seal the pores and reduce the permeability of the present invention. Therefore, it is suggested that if a surface coating is necessary holes penetrating past the coating may be required or a coating that penetrates within the pores without sealing them should be used. For examples of such penetrating coatings, one should refer to U.S. Pat. Nos. 5,702,761 and 5,928,775 for a discussion thereon, which are incorporated herein by reference.

Once the permeable ceramic tile is machined into the desired shape, such as leading edges or trailing edges of a spacecraft or an aircraft, the tile can be coated and installed in as necessary.

From the foregoing discussion, it should be appreciated that the method of the present invention produces a permeable, fiber-reinforced, ceramic tile that may be cooled by a cooling fluid, such as bleed air, so as to enable the fiber-reinforced ceramic tile to be used in high temperature applications. Still further, the method of the present invention produces a permeable, fiber-reinforced, ceramic tile that possesses approximately the same porosity, density, and strength of a standard ceramic tile, yet is sufficiently permeable to be cooled by a cooling fluid.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of manufacturing a permeable fiber-reinforced ceramic insulation article comprising:
   (a) providing a mixture having silica fiber, alumina fiber, an alumina borosilicate fiber, water, and dispersant;
   (b) disposing a organic particulate within said mixture;
   (c) mixing said organic particulate within said mixture to produce a (slurry of fibrous ceramic material;
   (d) placing said slurry within a mold and applying pressure to said slurry to substantially remove said water;
   (e) maintaining said pressure on said slurry in said mold to form a fibrous ceramic body;
   (f) drying said fibrous ceramic body;
   (g) sintering said dried fibrous ceramic body to a temperature sufficient to bond said fibers of said ceramic material together and form a porous ceramic article and that is further sufficient to generally burn off said organic particulate to create voids interconnecting said pores to form a permeable fiber reinforced porous ceramic insulation article.

2. The method according to claim 1 wherein said organic particulate is selected from the group consisting of seeds, wood pulp, and plastic.

3. The method according to claim 1, further comprising:
   (h) applying a surface coating to said permeable fiber reinforced porous ceramic insulation article.

4. The method according to claim 1 wherein said applying pressure to said slurry includes applying vacuum pressure from below the mold and ram pressure above the mold.

5. A method of producing a permeable fiber-reinforced ceramic article comprising:

(a) mixing a silica fiber, an alumina fiber, an alumina borosilicate fiber, water, a dispersant, and organic particulates to produce a slurry of fibrous ceramic material;
(b) placing said slurry within a mold and applying pressure to said slurry to substantially remove said water;
(c) maintaining said pressure on said slurry in said mold so as to form a fibrous ceramic body having said organic particulates interspersed therethrough;
(d) drying said fibrous ceramic body;
(e) sintering said dried fibrous ceramic body to a temperature sufficient to bond said ceramic material together and form a porous ceramic article and that is further sufficient to generally burn off said organic particulates to create voids interconnecting said pores to form a permeable fiber reinforced porous ceramic article; and
(f) applying a surface coating to said permeable fiber reinforced porous ceramic article.

6. The method according to claim 5 wherein said organic particulates are selected from the group consisting of seeds, wood pulp, and plastic.

7. A method of manufacturing a permeable fiber-reinforced ceramic insulation article comprising:
   (a) providing a mixture having silica fiber, alumina fiber, an alumina borosilicate fiber, water, and dispersant;
   (b) disposing an organic particulate within said mixture, said organic particulate is selected from the group consisting of seeds, wood pulp, and plastic;
   (c) mixing said organic particulate within said mixture to produce a slurry of fibrous ceramic material;
   (d) placing said slurry within a mold and applying pressure to said slurry to substantially remove said water;
   (e) maintaining said pressure on said slurry in said mold to form a fibrous ceramic body;
   (f) drying said fibrous ceramic body;
   (g) sintering said dried fibrous ceramic body to a temperature sufficient to bond said fibers of said ceramic material together and form a porous ceramic article and that is further sufficient to generally burn off said organic particulate to create voids interconnecting said pores to for a permeable fiber reinforced porous ceramic insulation article.

8. The method according to claim 7, further comprising:
   (h) applying a surface coating to said permeable fiber reinforced porous ceramic insulation article.

9. The method according to claim 7 wherein said applying pressure to said slurry includes applying vacuum pressure from below the mold and ram pressure above the mold.

* * * * *